Nov. 10, 1970   J. E. COORDES ET AL   3,538,786
MULTIPLE CORE FLEXIBLE CABLE CONTROL
Filed May 13, 1969

INVENTORS
JOHN E. COORDES
WALTER N. SHAW
BY H. M. Saragovitz
E. J. Kelly, H. Berl
and E. P. Barthel
ATTORNEYS United States Patent Office 3,538,786
Patented Nov. 10, 1970

3,538,786
MULTIPLE CORE FLEXIBLE CABLE CONTROL
John E. Coordes, Birmingham, and Walter N. Shaw, Franklin, Mich., assignors to the United States of America as represented by the Secretary of the Army
Filed May 13, 1969, Ser. No. 824,152
Int. Cl. F16c 1/10
U.S. Cl. 74—501                                    7 Claims

ABSTRACT OF THE DISCLOSURE

A force-transmitting device in which a plurality of flexible force transmitting core members extend through a flexible tubular casing member for limited axial displacement with respect to the casing. The device provides a linear array of ball bearings in rolling engagement with each of the outwardly facing surfaces of the core members and a single linear array of ball bearings in common rolling engagement with each of the inwardly facing surfaces of the core members to provide for multiple remote control core members operable in a unitary casing.

---

The invention described herein may be manufactured, used, and licensed by or for the Government for governmental purposes without payment to us of any royalty thereon.

BACKGROUND OF THE INVENTION

Field of the invention

This invention relates to push-pull flexible cables having multiple core members operable in a common tubular casing.

Description of the prior art

Prior art ball bearing push-pull flexible cables are typified in their construction by the U.S. Pat. 2,845,813 issued Aug. 5, 1958 and 3,154,966 issued Nov. 3, 1964 wherein a tubular casing houses a central slidable core strip, and two sets of ball-bearings adapted to roll between the movable core strip and race strips fixed to the inner wall of the casing. Cage strips, formed with a multiplicity of longitudinally spaced openings, are used to keep the ball bearings properly spaced longitudinally of the cable.

SUMMARY

The present invention provides a push-pull cable which is designed to permit the cable to have a plurality of core strips operable in a single flexible tubular casing while using a minimum of ball bearing sets to accomplish this result. In the preferred form the invention employs a control cable using three flat core members arranged symetrically along the cable axis forming the three sides of an equilateral triangle. By means of this construction only one set of ball bearings located on the core axis and common to the inwardly directed faces of the three core members will be required to cooperate with three separate sets of ball bearings contacting each of the outer core faces.

BRIEF DESCSIPTION OF THE DRAWINGS

DESCRIPTION OF THE PREFERRED EMBODIMENTS

Figure 1:
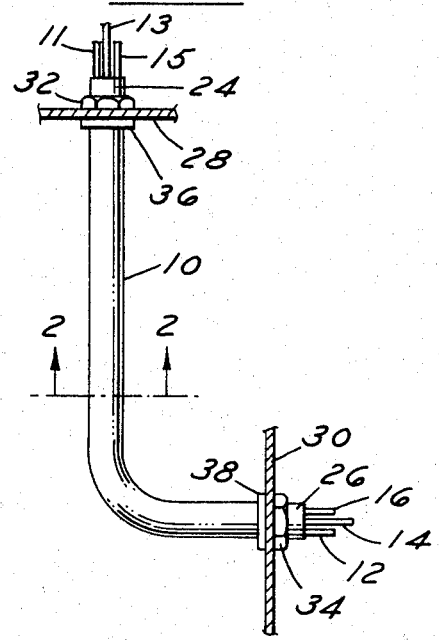
FIG. 1 is a reduced scale view of the flexible remote control cable according to the invention.

Referring now to the drawings, there is shown in FIG. 1 a push-pull cable device which includes a tubular sheath 10, made of a relatively flexible material such as a plastic resin material and having three core members positioned therein. Force-input and force-output end members 11, 12; 13, 14; and 15, 16 respectively are attached at the ends of the core members 18, 20 and 22 shown in FIG. 2.

The force transmitting core members are located along the longitudinal axis of the tubular sheath 10 while the pin-shaped force input and output end members are dimensioned for sliding movement in corresponding bores located in cylindrical end members 24 and 26. The end members 24 and 26 are retained in bulkheads 28 and 30 by suitable means such as outer locknuts 32 and 34 and inner flanges 36 and 38 integral with the end members.

The core members 18, 20 and 22 in the preferred embodiment comprise relatively flexible, flat-rod like members of metal, preferably having a high elastic limit. The core members are arranged with their transverse axes forming the sides of an equilateral triangle the center of which is located on the principal axis of the tubular sheath 10. The rod-like core members are made free to move longitudinally with a minimum of friction by the use of an interior set of ball bearings 40 and three peripheral sets of ball bearings 42, 44 and 46.

Figure 2:
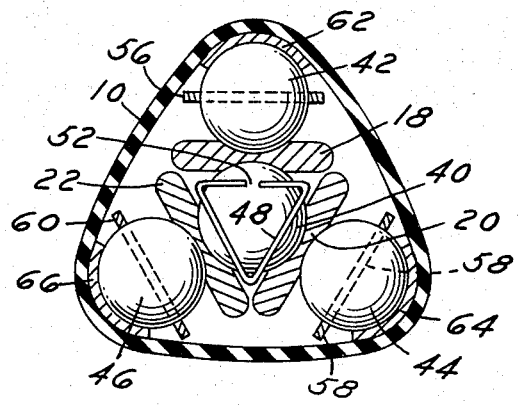
FIG. 2 is a cross-section taken in line 2—2 of FIG. 1.

An interior spacer cage, indicated at 48 in FIG. 2, is in the form of an elongated triangular shaped tube whose three sides each contain a plurality of uniformly spaced apertures 50 for loosely maintaining the axial aligned central ball bearings 40 at a substantially constant spacing. The apertures cooperating with one ball bearing are thus located with their centers in a common transverse plane.

The spacer cage 48 has folded areas weakened at spaced intervals between the bearings by means of scalloped openings 54 to provide increased flexibility of the cage about its longitudinal axis. The openings 54 could have various other shapes such as slots, for example, to provide the desired flexibility of the cage.

Each of the three outer sets of axially aligned ball bearings 42, 44 and 46 are maintained at an even spacing by means of conventional spacer cages 56, 58 and 60 of the type disclosed in U.S. Patent Re. 24,982 dated May 9, 1961, for example, being elongated rectangular members containing a plurality of spaced apertures.

The tubular sheath 10 has three arcuate shaped guiding tracks 62, 64 and 66 fixedly secured to the inner wall of the sheath 10 and positioned so that each track is in opposed alignment with a respective side of the triangular spacer cage 48 as shown in FIG. 2.

Figure 4:
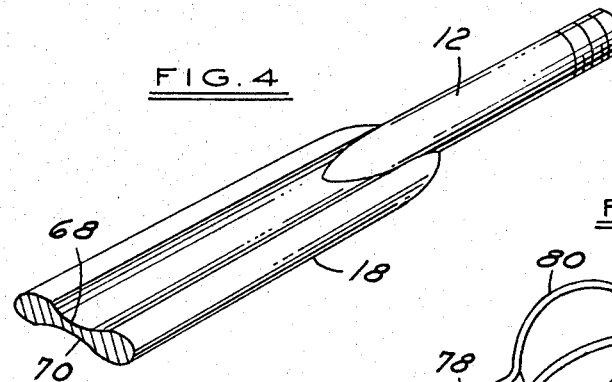
FIG. 4 is an enlarged elevation of the end portion of one of the core members.

Each of the core members 18, 20 and 22 has its opposite side faces formed with shallow rounded grooves 68, 70 as shown by core member 18 in FIG. 4 designed to receive in rolling engagement therewith one of the linear sets of ball bearings 42, 44 and 46 and the inner set of ball bearings 40. In this way each of the core members is adapted to be moved to and fro with respect to the tubular sheath 10 by means of pushing or pulling one of its respective end rods, such as the end rod 12 of FIG. 4.

Figure 3:
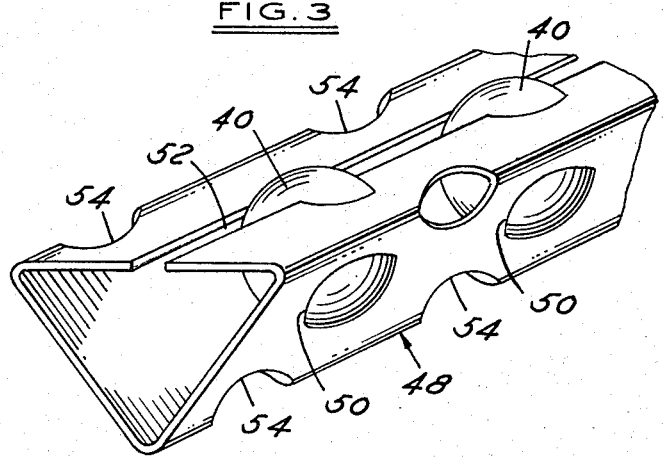
FIG. 3 is an enlarged detail fragmentary elevation view illustrating the construction of the inner ball cage of the invention.
Figure 5:
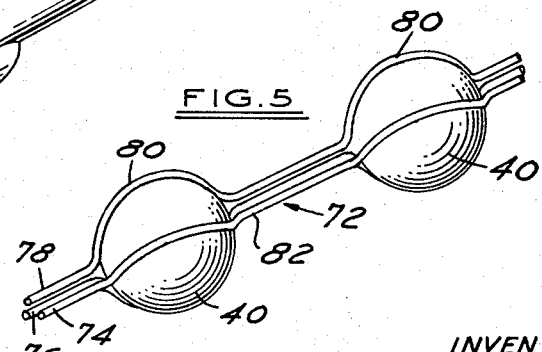
FIG. 5 is a fragmentary elevation of an alternative embodiment of the inner ball retainer cage.
Figure 6:
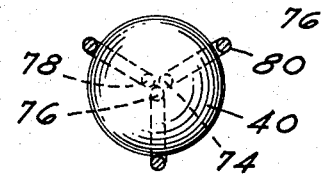
FIG. 6 is an end view, partly in section, of the structure of FIG. 5.

FIGS. 5 and 6 show an alternative embodiment of the inner spacer cage generally indicated at 72 and formed from round wire members 74, 76 and 78 each formed into a plurality of U-shaped loops 80. The loops 80 are shaped to cooperate with the corresponding loops of the remaining two wires to retain the individual ball bearings 40 therein while permitting free rotation thereof. The three wires 74, 76 and 80 are suitably joined at their rectilinear sections 82 such as by silver solder. As seen in FIG. 6, the wires are angularly positioned at substantially 120 degree spacing. It will be appreciated that the cage of FIG. 5 will permit increased flexibility of the cable assembly as contrasted with the cage of FIG. 3.

What we claim is:

1. A tubular remote control device for supporting a plurality of axially elongated force-transmitting members comprising in combination, casing means having an axis relative to which said members are axially movable, a plurality of guide means spaced about said axis parallelly extending throughout said casing means in fixed relationship thereto, a plurality of force transmitting core members parallelly extending through said casing means and spaced about said axis, each said core member having a pair of parallel, inwardly and outwardly directed faces each of which has a longitudinal groove therein, first rolling bodies of uniform diameter arranged along said axis in rolling engagement with each said core member and cage means to limit relative displacements between the rolling bodies, a plurality of second rolling bodies of uniform diameter arranged respectively in said outwardly facing grooves and said guide means and cage means associated with each of said second rolling bodies to limit relative displacements between the second rolling bodies.

2. A remote control device according to claim 1, wherein said guide means are arcuate shape in cross-section and subtend an angle less than 90 degrees.

3. A remote control device according to claim 1, wherein said core members comprise three relatively flexible flat rod-like members arranged so that their transverse axes form the sides of an equilateral triangle the center of which is intersected by said casing axis.

4. A remote control device according to claim 3, wherein the diameter of said first rolling bodies and said second rolling bodies are equal.

5. A remote control device according to claim 4, wherein said cage means associated with said first rolling bodies is a tube being equilateral in cross-section and having its sides substantially parallel respectively to said core members.

6. A remote control device according to claim 1, wherein said cage means associated with said first rolling bodies comprise a multiplicity of parallelly disposed round wires bound together in juxtaposed relation, each said wire having longitudinally disposed loops in a common plane cooperating with corresponding loops of the other wires for retention of respective rolling bodies in the cooperating loops.

7. A remote control device according to claim 6, wherein said cage means comprise three wires the loops of which are disposed in intersecting planes having equal angles of approximately 120 degrees therebetween.

References Cited

UNITED STATES PATENTS

| | | | |
|---|---|---|---|
| 2,218,903 | 10/1940 | Bratz | 74—501 |
| 3,362,249 | 1/1968 | Richoux | 74—501 |

MILTON KAUFMAN, Primary Examiner